United States Patent
Miller et al.

(10) Patent No.: US 7,300,002 B2
(45) Date of Patent: Nov. 27, 2007

(54) DOSING DEVICE

(75) Inventors: Frank Miller, Ilsfeld (DE); Hartmut Albrodt, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 10/514,994

(22) PCT Filed: Sep. 16, 2003

(86) PCT No.: PCT/DE03/03070

§ 371 (c)(1),
(2), (4) Date: Nov. 19, 2004

(87) PCT Pub. No.: WO2004/041422

PCT Pub. Date: May 21, 2004

(65) Prior Publication Data

US 2005/0161526 A1    Jul. 28, 2005

(30) Foreign Application Priority Data

Nov. 6, 2002 (DE) ................ 102 51 699

(51) Int. Cl.
*F02M 59/00* (2006.01)
*F02M 47/02* (2006.01)
*B05B 1/30* (2006.01)

(52) U.S. Cl. .............. 239/533.2; 239/533.12; 239/533.14; 239/88; 239/585.1; 239/585.3; 239/585.4; 239/585.5

(58) Field of Classification Search ............. 239/533.2, 239/533.3, 533.12, 533.14, 88–94, 585.1–585.5, 239/596, 600; 251/129.15, 129.4, 127
See application file for complete search history.

(56) References Cited

U.S. PATENT DOCUMENTS

| 3,362,647 | A | * | 1/1968 | Davis, Sr. et al. | .......... 239/404 |
| 3,685,742 | A | * | 8/1972 | Jackson | .......... 239/407 |
| 3,971,847 | A | | 7/1976 | Houseman | |
| 5,190,216 | A | * | 3/1993 | Deneke | .......... 239/5 |
| 5,484,108 | A | * | 1/1996 | Nally | .......... 239/553.3 |
| 5,544,816 | A | * | 8/1996 | Nally et al. | .......... 239/585.5 |
| 5,881,957 | A | * | 3/1999 | Mizuno et al. | .......... 239/533.2 |

FOREIGN PATENT DOCUMENTS

| EP | 1 335 127 | 8/2003 |
| WO | 02/42635 | 5/2002 |

* cited by examiner

*Primary Examiner*—Davis D. Hwu
(74) *Attorney, Agent, or Firm*—Kenyon & Kenyon LLP

(57) ABSTRACT

A dosing device for liquid fuels, in particular for input into a chemical reformer in order to recover hydrogen or into a post-combustion device in order to generate heat, includes at least one metering device for metering fuel into a metering conduit and a nozzle body, adjoining the metering conduit, includes at least one spray discharge opening which opens into a metering chamber, including a nozzle body having a perforated spray insert in which at least one spray discharge opening is disposed.

12 Claims, 2 Drawing Sheets

DOSING DEVICE

FIELD OF THE INVENTION

The present invention relates to a dosing device.

BACKGROUND INFORMATION

In fuel-cell-assisted transport systems, so-called chemical reformers may be used to recover the necessary hydrogen from hydrocarbon-containing fuels such as, for example, gasoline, ethanol, or methanol. Secondary combustion devices are used for heat generation, in particular in cold-start phases.

All the substances required by the reformer for execution of the reaction, for example air, water, and fuel, are conveyed to the reaction region ideally in a gaseous or at least atomized state. But because water and the fuels, for example methanol or gasoline, may preferably be present in liquid form on board the transport system, they must first be prepared shortly before they arrive at the reaction region of the reformer or the secondary combustion device. This may necessitate, for example, a dosing device that is capable of making the corresponding quantities of fuel or other substances available in finely atomized form.

Apparatuses for dosing fuels into reformers are discussed, for example, in U.S. Pat. No. 3,971,847. Here the fuel is fed in, by metering devices relatively remote from the reformer, through long delivery conduits and a single nozzle into a temperature-controlled material stream. The fuel first strikes impact panels that are disposed after the outlet opening of the nozzle and are intended to cause turbulence in and distribution of the fuel, and then travels into the reaction region of the reformer through a relatively long evaporation section that is necessary for the evaporation process. The long delivery conduit allows the metering device to be insulated from thermal influences of the reformer.

Particular disadvantages of the apparatuses discussed in the aforementioned document are the fact that below the operating temperature of the reformer, for example in a cold-start phase, atomization of the fuel occurs only insufficiently; and that the dosing device is configured in very complex and bulky fashion. Because of the relatively small reaction surface between fuel and oxidizer resulting in this context, combustion or chemical reaction occurs only slowly, and usually also incompletely.

The result is a distinct decrease in efficiency and a disadvantageous increase in pollutant emissions. Incomplete combustion or an incomplete chemical reaction usually results in the formation of aggressive chemical compounds that can damage the chemical reformer or secondary combustion device and cause deposits that can degrade functionality. The complex and bulky design in the nozzle region, where atomization is accomplished, results in high manufacturing and operating costs, especially because of poorer ease of assembly and greater susceptibility to error.

SUMMARY OF THE INVENTION

The dosing device according to the present invention is believed to have the advantage that atomization and distribution of the fuel or fuel/gas mixture is substantially improved. The result is that, for example, the cold-start phase can be substantially shortened, and the efficiency of the secondary combustion device or chemical reformer can be greatly increased already during the cold-start phase. Pollutant emissions are substantially reduced in this context.

With the dosing device according to the present invention it is moreover possible to manufacture the dosing device very easily, reliably, and therefore economically, and standardized components fabricated on a series basis, for example from series production of available fuel injection valves, can furthermore be used.

In a first refinement of the dosing device according to the present invention, the perforated spray insert is embodied in the form of a perforated spray disk.

In another exemplary embodiment, the nozzle body is shaped in tubular, in particular cylindrically tubular, fashion. As a result, it can be manufactured particularly simply and therefore economically, for example from a standardized noble metal (or stainless steel) tube or from other standardized preforms.

It may be additionally advantageous if the nozzle body is made up of several parts, in particular of a tubular support element and a tubular delivery tube that are connected in hydraulically sealed fashion by way of a tubular intermediate element. The parts of the nozzle body can thus be simply and economically adapted to different loads and conditions.

An annular seat element, and the perforated spray insert with spray discharge openings present therein that is located after the seat element in the spray-discharge direction, are advantageously disposed on the spray-discharge side of the tubular support element. The result is that the portion of the nozzle body on the spray-discharge side can be manufactured particularly simply and also, in particular, that nozzle bodies such as those from series production of fuel injection valves can be used with only few or no modifications.

It is also advantageous to join the seat element and the perforated spray insert to the support element in hydraulically tight fashion at their outer circumferences, in particular by pressing or welding, in particular laser welding. The joining point can thus be easily adapted to particular requirements.

Advantageously, the metering conduit and the metering device are joined in hydraulically sealed and detachable fashion by way of an adapter. Ease of installation is thereby enhanced.

In another exemplary embodiment, the adapter connecting the metering conduit and the metering device has an air inlet, the air inlet being connected, in the adapter, to the metering conduit. The result is that mixture preparation can already be initiated in the delivery conduit, the fuel and/or gas metered into the delivery conduit being mixed with air. The result is an overall improvement in the atomization, and the formation of a mixture with air, of the fuel and/or metered-in gas.

A fuel injection valve, such as the one used e.g. for reciprocating-piston machines with internal combustion, is advantageously utilized as the metering device. The use of such valves has several advantages. For example, they permit particularly accurate open- or closed-loop control of fuel metering, in which context the metering can be controlled by way of several parameters such as pulse duty factor, clock frequency, and optionally stroke length. The dependency on pump pressure is much less pronounced than in the case of metering devices that control the volumetric flow of the fuel by way of the conduit cross section, and the dosing range is much larger.

In addition, fuel injection valves are economical, reliable components that have proven successful in many ways, are understood in terms of their behavior, and are chemically stable with respect to the fuels used; this is true in particular of so-called low-pressure fuel injection valves that can be used with advantage here because of the thermal decoupling resulting from the metering conduit.

The delivery conduit advantageously has a number of reduced-wall-thickness points that decrease the thermal conductivity of the metering conduit and can also serve as heat sinks.

The multi-part construction of the dosing device makes possible economical manufacture and the use of standardized components.

DETAILED DESCRIPTION

Figure 1:
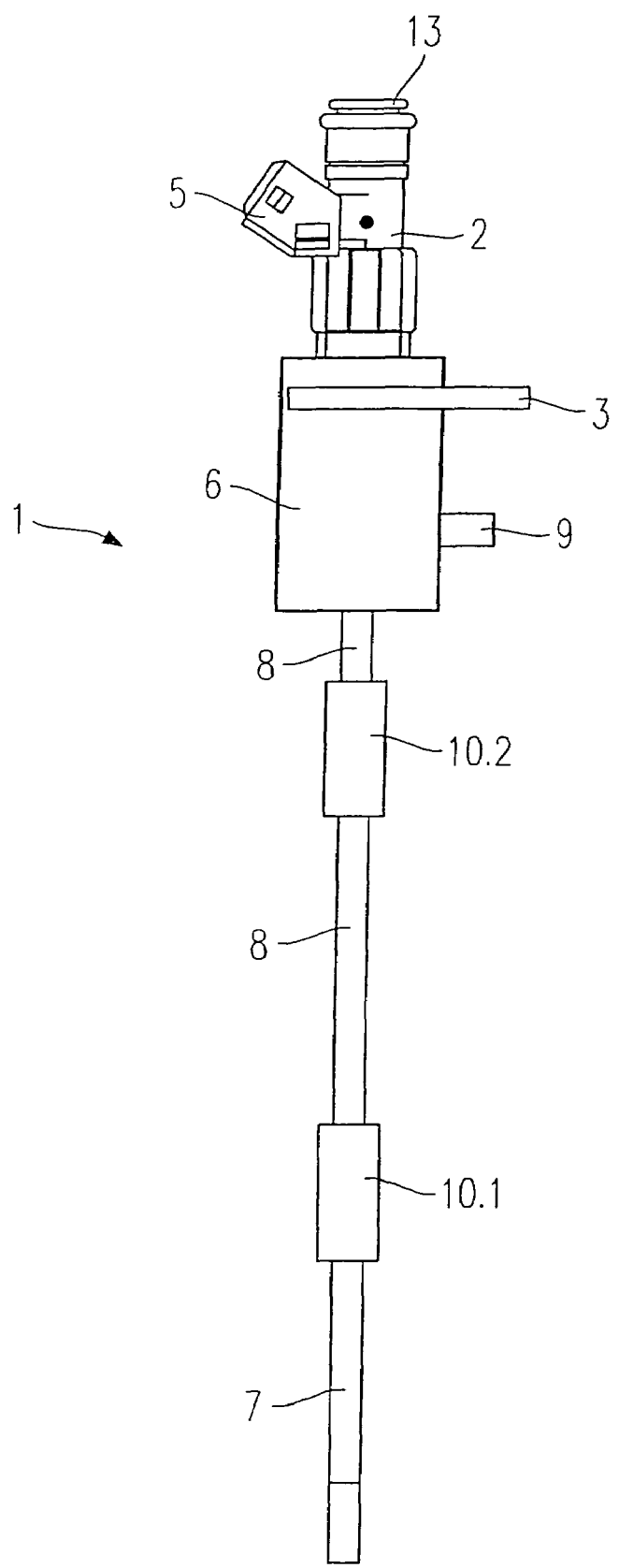
FIG. 1 shows a first exemplary embodiment of a dosing device according to the present invention.

An exemplary embodiment of a dosing device 1 according to the present invention depicted in FIG. 1 is embodied in the form of a dosing device 1 for the use of low-pressure fuel injection valves. Dosing device 1 is suitable in particular for the input and atomization of fuel or a fuel/gas mixture into a metering chamber (not depicted) of a chemical reformer (not depicted in further detail) in order to recover hydrogen, or of a post-combustion device (not depicted in further detail) in order to generate heat, in which context wetting of the inner wall of the metering chamber (not depicted) with fuel can be partly or completely prevented.

Dosing device 1 is made up of a metering device 2 which in this exemplary embodiment is embodied as a low-pressure fuel injection valve, an adapter 6 for receiving metering device 2 and a tubular metering conduit 8 e.g. 10 to 100 cm long, an air inlet 9, and a nozzle body 7. Metering device 2 is tubular and has on its upper side a fuel connector 13. On the side, metering device 2 has an electrical connector 5. Metering of fuel or a fuel/gas mixture into metering conduit 8 is accomplished on the underside of metering device 2, adapter 6 connecting metering device 2 and metering conduit 8 to one another in an externally hydraulically sealed manner. Tubular air inlet 9 opens into adapter 6 and is thus connected to delivery conduit 8.

The hollow-cylindrical end of nozzle body 7 facing toward metering conduit 8 is connected in hydraulically sealed fashion to metering conduit 8 by way of a hollow-cylindrical first connecting element 10.1. Metering conduit 8 itself is made, for example, of a standardized metal tube made of stainless steel. In this exemplary embodiment, metering conduit 8 is embodied in two parts, the part of metering conduit 8 facing toward adapter 6 being connected by way of a second connecting element 10.2 to the part of metering conduit 8 facing toward nozzle body 7. The lower part of metering device 2 engages into adapter 6 and is connected in hydraulically sealed fashion to adapter 6 by way of an attachment element 3 in the form of a clamp.

Nozzle body 7 has, in its spray-discharge end facing away from metering conduit 8, an annular seat element 4 (depicted in FIG. 2) and a perforated spray insert 11, located after that element in the spray-discharge direction, that has at least one spray discharge opening 14.

Fuel, for example gasoline, ethanol, or methanol, is delivered under pressure from a fuel pump and fuel line (not depicted) to metering device 2 through a fuel connector 13 located on the upper side of metering device 2. The fuel flows downward when dosing device 1 is in operation, and is metered into delivery conduit 8 through the sealing seat (not depicted) located in the lower end of metering device 2 in an available manner, by opening and closing of the sealing seat. Air or other gases, for example combustible residual gases from a reforming or fuel-cell process, can be delivered, for mixture preparation, through air inlet 9 that opens laterally via adapter 6 into delivery conduit 8 near metering device 2. As it continues, the fuel or fuel/gas mixture flows through delivery conduit 8 to nozzle body 7 and is there metered through spray discharge openings 14 (depicted in FIG. 2) into the metering chamber (not depicted).

Metering device 2, especially the sealing seat (not depicted) of metering device 2 that is sensitive to high temperatures and large temperature fluctuations, is thermally decoupled by metering conduit 8 from the temperatures in the metering chamber (not depicted), which can be e.g. 500° C. The length, material, and shape of metering conduit 8 are selected, in particular, in accordance with thermal and physical conditions. Metering conduit 8 may also have reduced-wall-thickness points that contribute to thermal insulation or can act as heat sinks.

Figure 2:
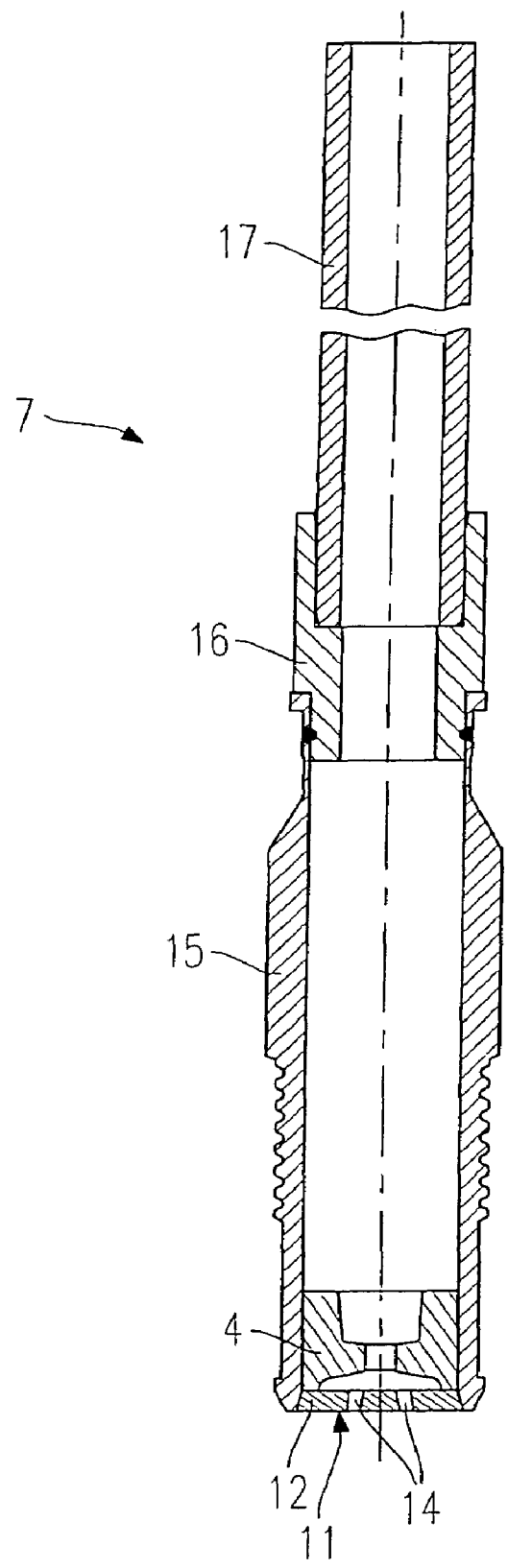
FIG. 2 shows, in section, the nozzle body of the first exemplary embodiment.

FIG. 2 schematically depicts, in section, nozzle body 7 of the first exemplary embodiment.

Nozzle body 7 is made up of a support element 15, a delivery tube 17, and an intermediate element 16 that connects support element 15 and delivery tube 17 in hydraulically sealed fashion. All three aforesaid components 15, 17, 16 are hollow-cylindrical in shape and made of metal.

Delivery tube 17, which is connected to delivery conduit 8 (shown in FIG. 1) by first connecting element 10.1, is surrounded, at the end facing away from first connecting element 10.1, by the end of intermediate element 16 that faces toward it. Support element 15 surrounds, with its end facing toward intermediate element 16, the end of intermediate element 16 that faces toward it. Intermediate element 16 is joined in hydraulically sealed fashion to support element 15 and to delivery tube 17 by pressing, soldering, or welding, in particular laser welding. The connection can also be achieved by way of a screw connection.

Located in the spray-discharge end of support element 15 facing away from intermediate element 16 are annular seat element 4 and perforated spray insert 11 disposed on the spray-discharge side of that element, that insert being configured in this exemplary embodiment as a perforated spray disk 12. The disposition of support element 15, seat element 4, and perforated spray disk 12 is similar or corresponds to the spray-discharge-end configuration of a fuel injection valve as from reciprocating-piston engines with internal combustion from the automotive sector. Not present, however, is the valve needle with valve closure element used therein, which would constitute a sealing seat with seat element 4 on the spray-discharge side.

Advantageously, this disposition can also be used economically as nozzle body 7 in the exemplary embodiment of the present invention. In particular, numerous perforated spray disks or stepped disks that are already in series production, and are readily available and thus economical, are thus available for nozzle body 7. As a result of the disposition of spray discharge openings 7 in the perforated spray disk or stepped disk, the emerging fuel cloud can be advantageously influenced in terms of its shape and extent, and can have a swirl imparted to it.

What is claimed is:

1. A dosing device which doses a liquid fuel into a chemical reformer to recover hydrogen or into a post combustion device to generate heat, comprising:
   at least one metering device for metering fuel into a metering conduit; and a nozzle body adjoining the metering conduit, and including at least one spray discharge opening, wherein the nozzle body includes a perforated spray insert in which the at least one spray discharge opening is disposed, wherein the metering conduit and the metering device are joined in a hydraulically sealed and detachable manner by an adapter including an air inlet that is connected, in the adapter, to the metering conduit; and wherein the nozzle body includes a tubular support element and a tubular delivery tube that are connected in a hydraulically sealed manner by a tubular intermediate element.

2. The dosing device of claim 1, wherein the perforated spray insert includes a perforated spray disk.

3. The dosing device of claim 2, wherein the nozzle body is tubular.

4. The dosing device of claim 2, wherein the nozzle body is cylindrically tubular.

5. The dosing device of claim 1, wherein the nozzle body is cylindrically tubular.

6. The dosing device of claim 1, wherein an annular seat element and the perforated spray insert, with spray discharge openings present therein that are located after the seat element in a spray discharge direction, are disposed on a spray discharge side of the tubular support element.

7. The dosing device of claim 6, wherein the seat element and the perforated spray insert are joined to the support element in a hydraulically tight manner at their outer circumferences.

8. The dosing device of claim 6, wherein the seat element and the perforated spray insert are joined to the support element in a hydraulically tight manner at their outer circumferences, by one of pressing, welding and laser welding.

9. The dosing device of claim 1, wherein the metering device includes a fuel injection valve.

10. The dosing device of claim 1, wherein the fuel injection valve includes a low pressure fuel injection valve that operates at fuel pressures of up to 10 bar.

11. The dosing device of claim 1, wherein the metering conduit includes in its axial extent one of at least one reduced wall thickness point and one reduced wall thickness region.

12. The dosing device of claim 1, wherein the nozzle body is tubular.

* * * * *